Dec. 18, 1962 A. MOHR, JR 3,068,888
BURNER VALVE
Filed Feb. 23, 1960 2 Sheets-Sheet 1
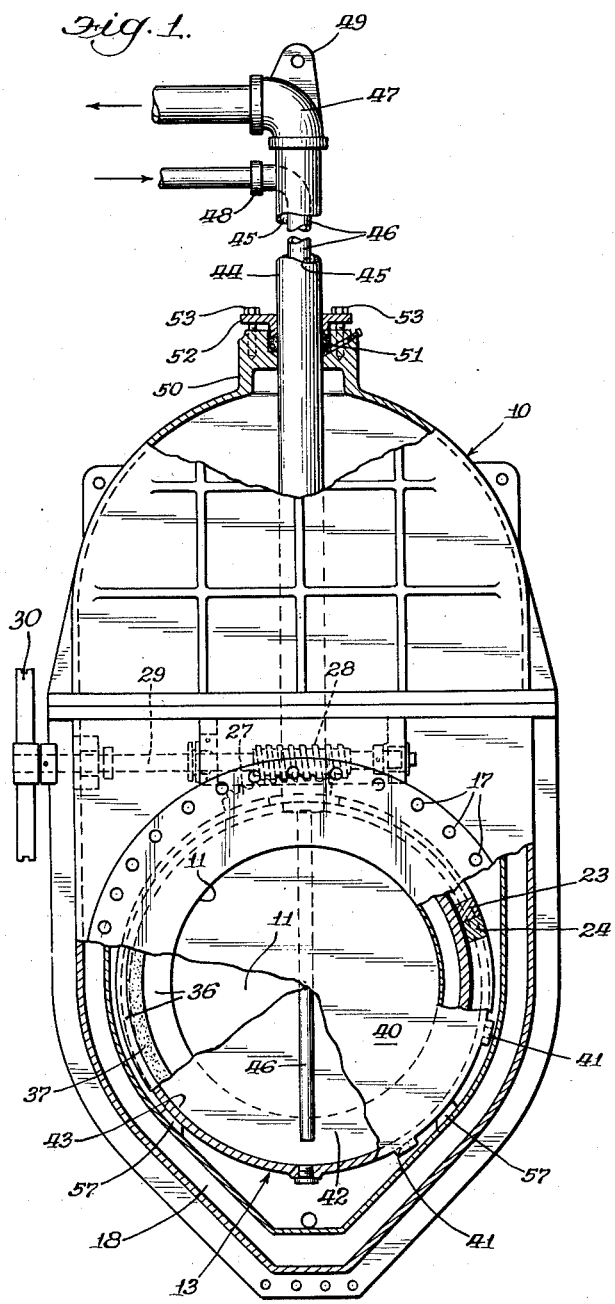
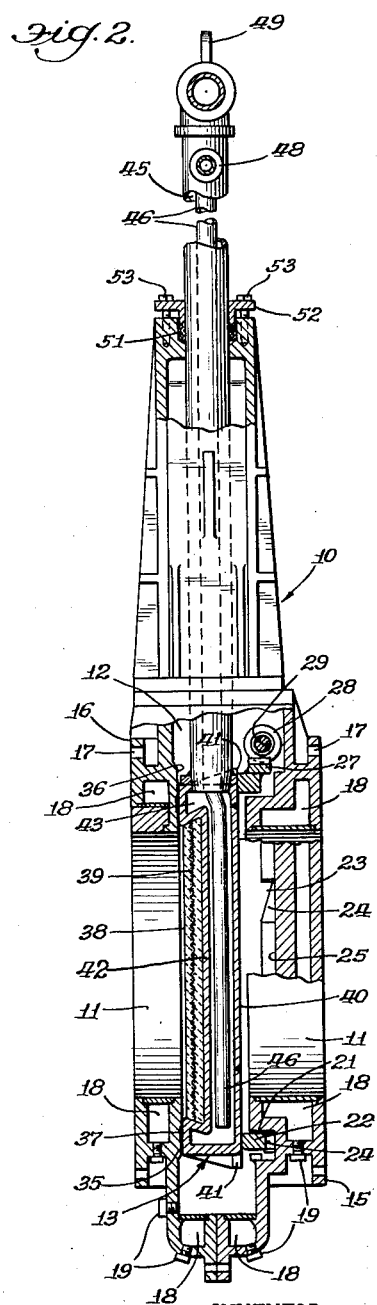
INVENTOR.
Albert Mohr, Jr.
BY
Frost & Vandenburgh
Attys.

Dec. 18, 1962

A. MOHR, JR 3,068,888

BURNER VALVE

Filed Feb. 23, 1960

INVENTOR.
Albert Mohr, Jr.
BY
Frost & Vandenburgh
Attys

3,068,888
BURNER VALVE

Albert Mohr, Jr., Chicago, Ill., assignor to John Mohr & Sons, Chicago, Ill., a corporation of Illinois
Filed Feb. 23, 1960, Ser. No. 10,144
3 Claims. (Cl. 137—340)

The present invention relates to a gate valve such as might be used as a burner valve in a hot blast stove.

In a hot blast stove used by the steel industry, it is necessary to provide tight closing valves for the conduits handling gaseous fluids to the stove. These valves are of very substantial size, for example, the conduit through which they are to control the fluid flow may be as much as four feet or more in diameter. With such large valves the problems of obtaining a tight seal of the gate or moveable member when the valve is closed is more difficult of solution than it is with a small gate valve.

Where relatively high temperatures are encountered, as is the situation with respect to the use of valves in conjunction with a hot blast stove, the temperatures add to the difficulty in obtaining a satisfactorily operating valve. The temperature situation may cause the valve to become wedged after it has been closed, due to temperature changes, making it extremely difficult to open. Also the high temperatures and temperature variations may result in the valve sticking when it is being closed and cause an unsatisfactory and insufficient fluid seal so that the valve leaks.

The principal object of the present invention is to provide a valve that will operate properly even though subjected to the conditions encountered with use in connection with a hot blast stove. The valve may be produced in the very large sizes necessary for use with such equipment and it is easily opened and closed. When closed a tight, positive, seal is obtained with no difficulty even though a very substantial fluid pressure is exerted on the gate.

Further objects and advantages will become apparent from the following description taken in conjunction with the drawings in which:

FIGURE 1 is an elevational view partially in section of an embodiment of the valve as seen at the low pressure side thereof;

FIGURE 2 is a side view partially in section of the embodiment of FIGURE 1;

Figure 3:
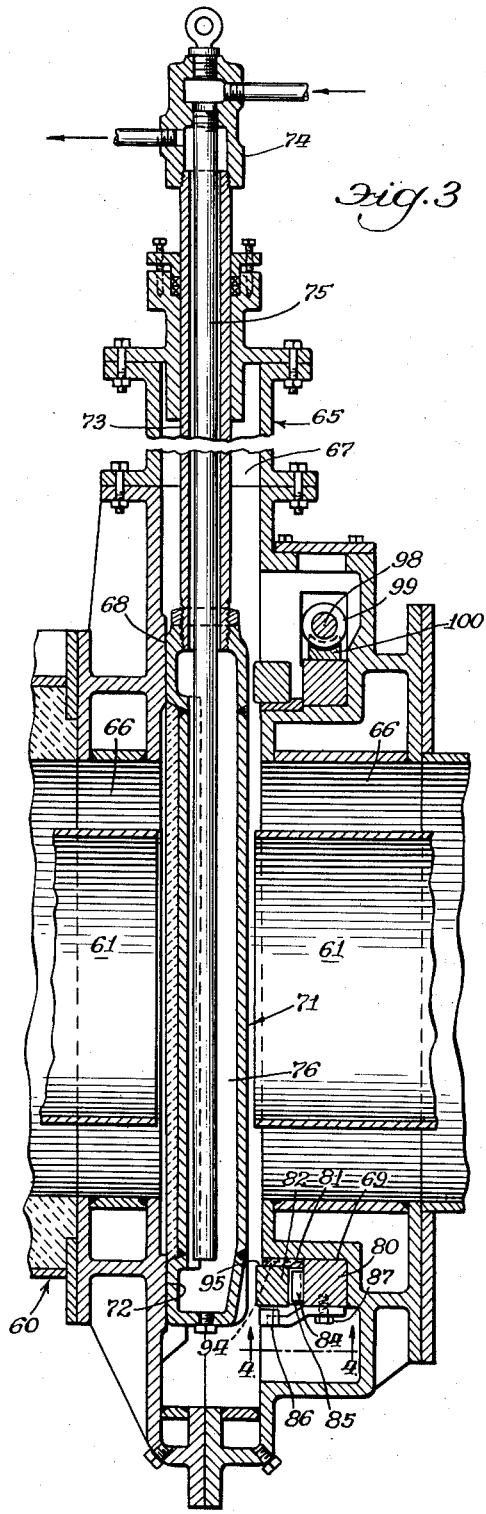
FIGURE 3 is a view corresponding to FIGURE 2 of an alternative embodiment.

In the illustrated embodiment of FIGURES 1 and 2 the valve body 10 is formed of a plurality of castings. The exact number of castings, the shape of each individual casting, etc., will depend upon the particular application and the preferences of the manufacturer. The valve body defines a cylindrical opening 11 which is the fluid passageway in communication with the pipes or conduits (not shown) through which the flow of fluid is to be controlled. In addition, the body defines an internal chamber 12, which intersects and extends to one side of passageway 11, to receive a gate generally indicated at 13.

At one side of body 10 is a flange 15 and at the opposite is a similar flange 16. Each of flanges 15 and 16 are provided with bolt holes 17 through which bolts may be placed to connect the valve to the conduit or other apparatus in conjunction with which the valve is to be used. The side of valve represented by flange 15 is the low pressure side while the side of the valve represented by flange 16 is the high pressure side. In using the valve in connection with a hot blast stove, flange 16 represents the stove side of the valve.

Body 10 is provided with a plurality of ducts 18 through which a coolant, such as water, may be circulated to prevent the overheating or to control the temperature of valve body 10. Drain plugs 19 can be suitably located to enable the coolant to be drained from the valve in case that action is necessary or desirable.

Immediately adjacent chamber 12 at the low pressure side of the valve is an annular rim 21 forming a part of valve body 10. This rim is positioned concentrically with passageway 11 and a slight distance outside the passageway as best seen in FIGURE 2. A ring 22 is slideably received about rim 21. Ring 22 forms a plurality of inclined planes 23 at spaced points about a side of the ring. A wall 25 about rim 21 and facing ring 22 likewise forms a plurality of inclined planes 24 positioned at spaced points corresponding to the spacing of inclined planes 23. As will be apparent hereafter, planes 23 and 24 act as wedges to securely seat gate 13 against face 36 of valve body 10. A segment of a gear or rack 27 is positioned about one portion of ring 22. It is suitably secured to the ring as by means of welding. The curved rack 27 is engaged by a worm gear 28 attached to a shaft 29. Shaft 29 extends out through the wall of body 10 and is suitably journaled in the body. At its outer end it carries an operating wheel 30 used to rotate shaft 29. Wheel 30 may be a suitable pulley or sprocket for remote operation or may be a hand wheel where remote operation is not needed.

Gate 13 has an annular face 35 on the high pressure side which matches a corresponding face 36 on valve body 10. If desired, one or both of faces 35 and 36 may have recesses to receive a ring of gasket material 37.

Annular face 35 defines a recess within which is a refractory material 38. Preferably, the refractory material is cast within the recess and is reinforced by a wire mesh 39.

The side of gate 13 opposite annular face 35 forms a plane face 40. Extending from the periphery of the gate are a plurality of tabs 41. The sides of tabs 41 are in the same plane as that of face 40 so that they form pressure points for the closing of the valve as hereinafter described.

Gate 13 has a hollow interior 43 through which a coolant may be flowed. A pipe 44 is threaded into the top of the gate with the hollow interior 45 of pipe 44 being in communication with the hollow interior 43 of gate 13. A tube 46 extends through the hollow interior 45 of pipe 44 and into the interior 43 of gate 13. The external diameter of tube 46 is smaller than the internal diameter of pipe 44. Pipe 44 and tube 46 are provided with connections 47 and 48 respectively to which flexible hoses may be secured for the circulation of coolant through gate 13. Normally connection 48 will be used as the intake for the coolant while connection 47 will be the discharge connection. The top of the fitting forming connection 47 on pipe 44 has an eye plate 49 to which a clevis may be secured for raising gate 13 with respect to body 10.

At the top of body 10 a boss 50 forms a stuffing box to receive a packing gland 51. Packing 51 is held in place by a ring 52. Bolts 53 tapped into body 10 hold ring 52 down to compressed packing 51 about pipe 44.

FIGURES 1 and 2 illustrate the gate 13 in the released position. That is, it is free to be raised or lowered withing chamber 12. To raise it, of course, an upward pull on eye plate 49 will move gate 13 into the upper portion of chamber 12. When this upward pull is released the weight of gate 13 will lower it into the position illustrated in FIGURES 1 and 2. Stops 57 are provided on body 10 at the bottom of chamber 12 to arrest the downward movement of gate 13.

To secure the gate tightly in place against the fluid pressure on the high pressure side of the valve (as represented by flange 16) wheel 30 and worm gear 28 are rotated in a direction such as to rotate ring 22 in a clockwise direction as viewed in FIGURE 1. With this rotation of ring 22, the inclined plane 23 thereon moves up on the inclined plane 24 on body 10. The wedging action thus achieved moves ring 22 to the left in FIGURE 2 and causes the ring to press against the periphery of face 40 of gate 13 and/or the faces of pressure tabs 41 extending therefrom. The support for gate 13 permits a corresponding movement of the gate to the left in FIGURE 2 to press annular face 35 of the gate against face 36 of the body 10. The contact of the two faces 35 and 36, in conjunction with gaskets 37 if used, provides a fluid tight seal between the gate 13 and face 36 surrounding the high pressure side of passageway 11.

To open the gate ring 22 is rotated counterclockwise (as viewed in FIGURE 1) thus moving inclined plane 23 down off of inclined plane 24. Ring 22 is now no longer being actively pressed against gate 13 so that gate 13 is free to move vertically. As previously mentioned gate 13 now may be raised by a lifting force applied to plate 49 and pipe 44.

In the embodiment illustrated in FIGURES 1 and 2, the ring 21 has two separate movements. It has a rotational movement to create the engagement between the inclined planes 23 and 24 and a sliding movement with respect to the gate resulting from the engagement of those planes. In some instances there will be substantial advantages achieved by having those two movements performed by a pair of parts respectively, e.g. two rings rather than the single ring illustrated in FIGURES 1 and 2. A structure for accomplishing this purpose is illustrated in FIGURES 3 and 4.

Figure 4:
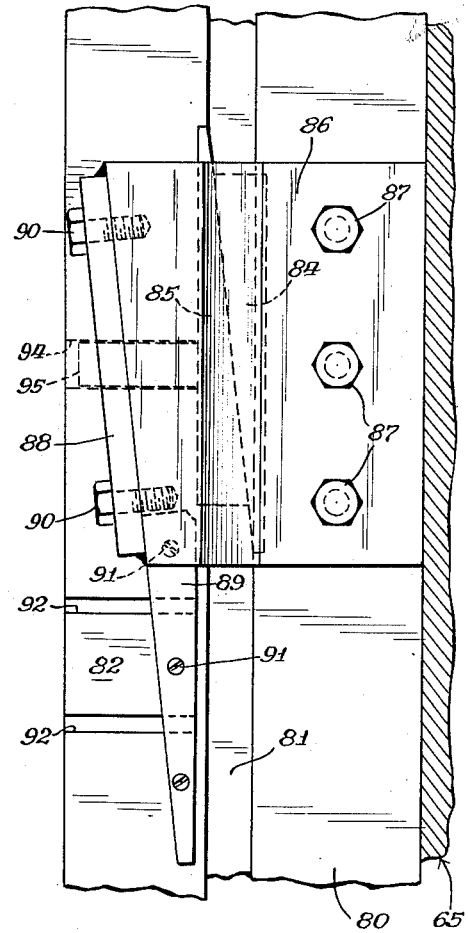
FIGURE 4 is an enlarged partial view of the wedges as seen at line 4—4 of FIGURE 3.

Referring to FIGURE 3, a hot blast stove, generally indicated at 60, is heated by the burning of gas introduced through a tube 61. Air for combustion is introduced through the space about tube 61. A valve having a body generally indicated at 65 is used to close off the openings from the burner to the stove after the stove has been heated to allow air to be heated in the stove for use in a blast furnace. Valve body 65 has an annular passageway 66 to connect the burner with the stove. A gate chamber 67 intersects passageway 66. About passageway 66 at the high pressure side of the valve, body 65 defines a sealing face 68 which is annular in shape. At the low pressure side of the valve a circular shoulder 69 extends about passageway 66.

Within chamber 67 is a gate generally indicated at 71 which has an annular sealing face 72 to mate with face 68 on the valve body 65. Gate 71 is supported by a pipe 73 terminating in a header or manifold 74. A tube 75 extends through the interior of pipe 73 from manifold 74. Tube 75 continues down through the majority of the hollow interior 76 of gate 71 to enable the circulation of coolant through the gate as previously described. Movably received on shoulder 69 is a rotating ring 80. It is held in place by a bearing sleeve 81 secured to shoulder 69. Movably received on sleeve 81 is a sliding ring 82.

Between rings 80 and 82 are five pairs of pushing wedges and five pairs of retracting wedges. The pairs of wedges are spaced 72° apart about the rings. One pair of pushing wedges and one pair of retracting wedges are seen at the bottom of the rings in FIGURE 3 and are illustrated in detail in FIGURE 4.

A pair of pushing wedges 84 and 85 are suitably secured to rings 80 and 82 respectively. In the illustrated embodiment the wedges 84 and 85 are received in slots of corresponding size in the rings and are welded in place. Extending over wedges 84 and 85 is a bracket 86 which is secured to ring 80 by bolts 87. A retracting wedge 88, one of the pair of retracting wedges of which wedge 89 is the other, is secured to the outer end of bracket 86 by bolts 90. The other retracting wedge 89 is attached to ring 82 by recessed screws 91. Wedge 89 also has a pair of keys (not shown) which are engaged in keyways 92.

It will be apparent from a study of FIGURE 4 that in effect the two pairs of wedges, one pair being wedges 84 and 85 and the second pair being wedges 88 and 89, function as a segment of a square thread. In effect the wedges provide a series of threaded engagements about the periphery of the two rings 80 and 82.

The inner side of ring 82 and the outer side of sleeve 81 have mating slots and keys 94 and 95, respectively. The engagement of slots 94 with keys 95 permit ring 82 to slide toward and away from gate 71. At the same time they prevent any rotational movement of ring 82.

As in the embodiment illustrated in FIGURES 1 and 2, a shaft 98 is suitably journaled in body 65 and carries a worm gear 99. Gear 99 engages a rack 100 in the form of a gear segment attached to rotating ring 80. Thus, with the rotation of shaft 98 by a suitable means outside the body 65 of the valve, ring 80 may be rotated in either direction.

Referring to FIGURE 4, if ring 80 is moved downwardly with respect to the valve body 65 and ring 82, the inclined planes formed by the two pushing wedges 84 and 85 will ride up on each other to provide a force to move sliding ring 82 to the left (as ring 82 is viewed in FIGURE 4) away from ring 80. Referring back to FIGURE 3, the movement of sliding ring 82 away from rotating ring 80 moves the sliding ring against the back side of gate 71 and will apply pressure to bring faces 68 and 72 of the body and gate respectively into sealing engagement.

When it is desired to open the valve, ring 80 is rotated in the opposite direction, i.e. it is moved upwardly in FIGURE 4. Such a movement disengages the pushing wedges 84 and 85. At the same time it brings the retracting wedges 88 and 89 into engagement so as to apply a force to move sliding ring 82 to the right in FIGURE 4 or toward rotating ring 80. This draws the sliding ring 82 away from gate 71 so that the gate is now free to be moved vertically by a lifting force applied to pipe 73.

The foregoing description of specific embodiments is for the purpose of complying with 35 USC 112 and should not be construed as imposing unnecessary limitations upon the appended claims inasmuch as modifications and variations thereof will be apparent to one skilled in the art.

I claim:
1. A gate valve comprising a valve body, said body having a pair of cylindrical inner walls concentric about a common axis and defining a fluid passageway, said walls being spaced apart along said axis to define a gate chamber between the adjacent ends of the walls, said chamber extending beyond one side of said walls a distance at least substantially equal to the diameter of said walls, sealing means about said adjacent end of one of said walls in a plane substantially normal to said axis, an annular shoulder about the other of said walls and concentric therewith, said shoulder having one edge thereof approximately coplanar with said adjacent end of said other wall, and an abutment about said shoulder at the other edge thereof; a gate in said chamber and movable with respect to said body between a first position at which said gate extends across said passageway to a second position at which said passageway is open, said gate in said first position being movable toward and away from said sealing means, said gate having sealing means about the one side thereof adjacent the sealing means on said body; and means to move said gate toward the sealing means on said body when said gate is in the first position to cause the sealing means to effect a fluid seal between the gate and the body, said last means including a first ring rotatably mounted on said shoulder adjacent said abutment, said ring being restrained against movement parallel to said axis, a second ring slidably mounted on said shoulder between said first ring and said gate when in the first position, said second ring being restrained against rotation about said axis, a plurality of inclined planes positioned between said rings and attached to the rotatable ring, a matching plurality of inclined planes attached to the sliding ring and in juxtaposition to the planes on the rotatable ring, whereby rotation of the first ring in one direction will engage said planes to move the second ring toward the gate, a second set of inclined planes attached to the rotatable ring, and facing in the opposite direction, a matching second set of inclined planes attached to the sliding ring in juxtaposition to the second set on the rotatable ring whereby rotation of the first ring in the reverse direction will engage said second sets of planes to move said second ring away from the gate, and means operable from outside the body and engaging the rotatable ring to rotate the same.

2. A gate valve comprising a valve body having a pair of cylindrical inner walls concentric about a common axis and defining a fluid passageway, said walls being spaced apart along the common axis to define a gate chamber between the spaced adjacent ends of the walls, said chamber extending beyond one side of said walls a distance at least substantially equal to the diameter of said walls; sealing means about the end of one of said walls on one side of the gate chamber in a plane substantially normal to said common axis; an annular shoulder about said one wall on the other side of said gate chamber; a gate in said chamber, said gate being movable with respect to said body between a first position at which said gate extends across said passageway to a second position at which said passageway is open, said gate in said first position being movable toward and away from said sealing means, said gate having sealing means about the one side thereof adjacent the sealing means on said body; and a wedge assembly to apply pressure to said gate when said gate is in the first position and to withdraw said applied pressure upon the application of an external force, said wedge assembly including a first ring mounted on said shoulder, said first ring being adapted for rotatable movement on said shoulder and restrained against movement in an axial direction parallel to said common axis of the cylindrical inner walls of the valve body, a second ring mounted on said shoulder between said first ring and the gate when the gate is in said first position, said second ring being mounted for movement in an axial direction parallel to the common axis of the cylindrical inner walls of the valve body, said second ring being non-rotatably mounted with respect to said shoulder, a plurality of sets of wedges of two pairs each, respectively, positioned on said first and second rings, respectively, in juxtaposed mating relation thereon in substantially equally spaced intervals thereabout, one pair of each set adapted to urge the gate toward sealing relation with said sealing means upon rotation of the first ring in one direction and the other pair of each set adapted to release the sealing relation defined by the action of said one pair of each set of wedges upon rotation of the first ring in the opposite direction, said pairs of wedges, respectively, being effective to establish and release the sealing relation of the gate and the sealing means only upon rotation of the first ring in the predetermined angular direction with respect to said pairs of wedges, respectively.

3. A gate valve comprising a valve body having a pair of cylindrical inner walls concentric about a common axis and defining a fluid passageway, said walls being spaced apart along the common axis to define a gate chamber between the spaced adjacent ends of the walls, said chamber extending beyond one side of said walls a distance at least substantially equal to the diameter of said walls; sealing means about the end of one of said walls on one side of the gate chamber in a plane substantially normal to said common axis; an annular shoulder about said one wall on the other side of said gate chamber; a gate in said chamber, said gate being movable with respect to said body between a first position at which said gate extends across said passageway to a second position at which said passageway is open, said gate in said first position being movable toward and away from said sealing means, said gate having sealing means about the one side thereof adjacent the sealing means on said body; and a wedge assembly adapted to apply pressure to the gate when said gate is in the first position and to withdraw said applied pressure upon the application of an external force, said wedge assembly including a first ring rotatably mounted on said shoulder, said first ring being restrained against movement in an axial direction parallel to said common axis of the cylindrical inner walls of the valve body, a second ring mounted on said shoulder between said first ring and the gate when the gate is in said first position, said second ring being mounted for movement in an axial direction parallel to the common axis of the cylindrical inner walls of the valve body, and being non-rotatably mounted with respect to said shoulder, a plurality of sets of wedge-like members positioned between said rings and attached to the first ring, a matching plurality of sets of wedge-like members attached to the mating face of the second ring in juxtaposed relation to the members on the first ring, the sets of wedge-like members affixed to said first and second rings, respectively, defining two inclined interfaces oppositely inclined with respect to each other, whereby rotation of the first ring a limited amount in one direction will engage one of said inclined planes to move the second ring toward the gate and whereby rotation of the first ring in the reverse direction will engage the other of said inclined planes to move the second ring away from the gate; and, means to rotate said first ring.

References Cited in the file of this patent

UNITED STATES PATENTS

| | | |
|---|---|---|
| 592,478 | Neeland | Oct. 26, 1897 |
| 1,545,696 | Riley | July 14, 1925 |
| 1,563,605 | Wilcox | Dec. 1, 1925 |
| 1,995,727 | Wetherbee | Mar. 26, 1935 |
| 2,214,959 | Hamer | Sept. 17, 1940 |
| 2,437,083 | Dons | Mar. 2, 1948 |
| 2,558,247 | Hamer | June 26, 1951 |

FOREIGN PATENTS

| | | |
|---|---|---|
| 635,997 | France | Jan. 6, 1928 |